Figure 1:
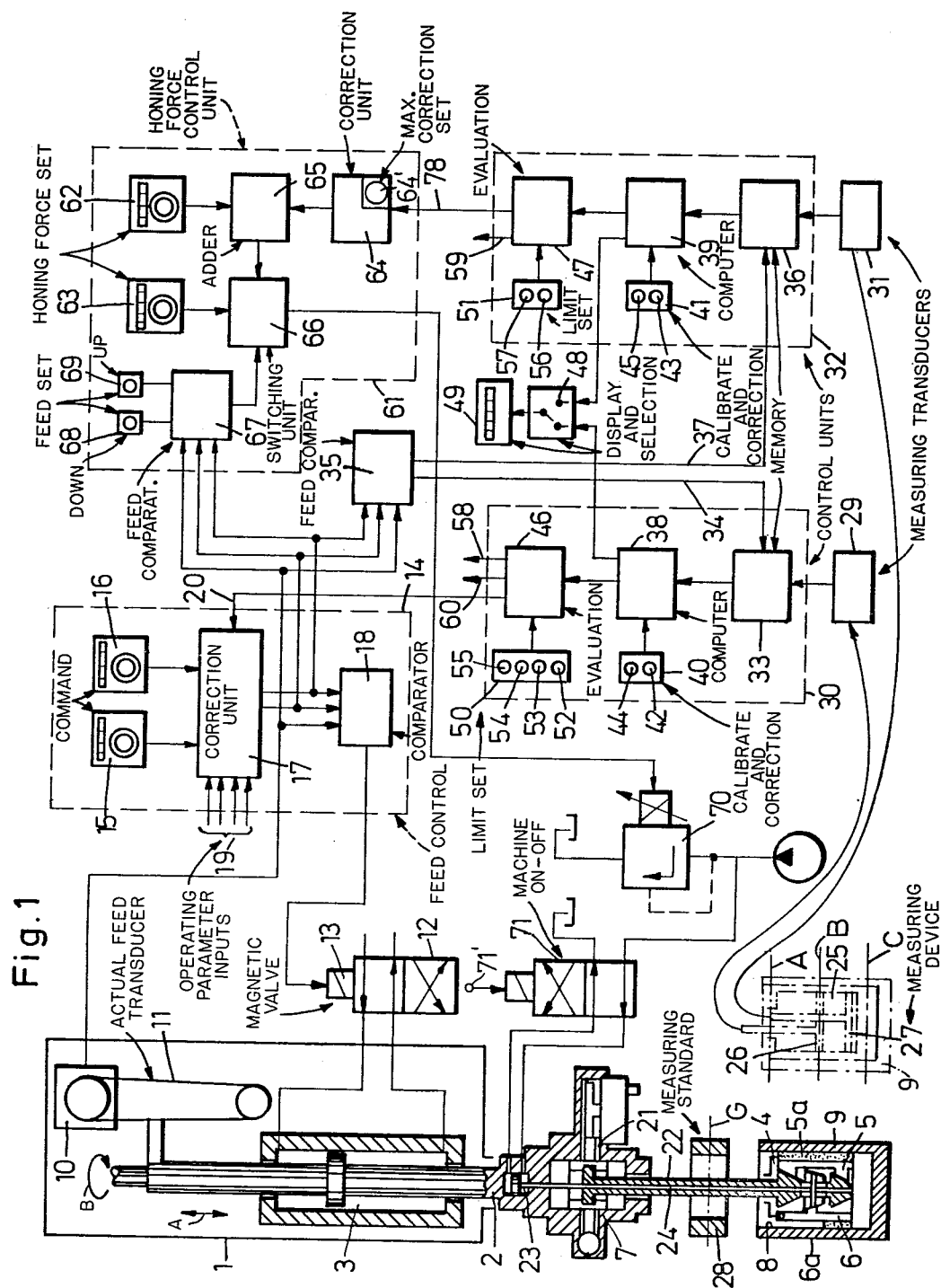

United States Patent [19]
Gehring

[11] 4,455,789
[45] Jun. 26, 1984

[54] SELF-CONTROLLED HONING MACHINE

[75] Inventor: Heinz Gehring, Ostfildern, Fed. Rep. of Germany

[73] Assignee: Maschinenfabrik Gehring GmbH & Co., KG, Ostfildern, Fed. Rep. of Germany

[21] Appl. No.: 311,792

[22] Filed: Oct. 15, 1981

[30] Foreign Application Priority Data

Oct. 18, 1980 [DE] Fed. Rep. of Germany ........... 30467

[51] Int. Cl.$^3$ ............................................... B24B 5/10
[52] U.S. Cl. .................................. 51/34 J; 51/165.83; 51/165.93
[58] Field of Search ............... 51/34 J, 165.82, 165.83, 51/165.85, 165.93, 347, 349; 318/571, 39

[56] References Cited

U.S. PATENT DOCUMENTS

| | | | |
|---|---|---|---|
| 3,286,409 | 11/1966 | Greenberg | 51/34 R |
| 4,122,379 | 10/1978 | Richter et al. | 318/634 X |
| 4,145,845 | 3/1979 | Ebelt | 51/165.93 X |
| 4,173,847 | 11/1979 | Gehring et al. | 51/165.85 X |
| 4,256,999 | 3/1981 | Richter et al. | 318/626 X |

FOREIGN PATENT DOCUMENTS 1963233 10/1972 Fed. Rep. of Germany .
1370827 10/1974 United Kingdom .

Primary Examiner—E. R. Kazenske
Assistant Examiner—Willmon Fridie, Jr.
Attorney, Agent, or Firm—Frishauf, Holtz, Goodman & Woodward

[57] ABSTRACT

To insure that cylindrical bores, and particularly blind bores (8) in a workpiece (9) are truly cylindrical, or of predetermined geometry even in the region adjacent the bottom of the blind bores, a honing blade carrier (4) has a set of long honing blades (5, 5a) of about the length of the bore and a set of short honing blades (6, 6a) located adjacent the bottom of the bore on the tool, with the short honing blades being independently adjustable; sensing elements (25, 26, 27) are integrated with the tool carrier (4) to sense the dimension of the bore at various levels or planes (A, B, C), the output signal from the plane (C) of the bottom of the bore being processed in a controlled channel (32) to adjust, individually, the honing pressure exerted by the short blades, in relation to tool feed, and hone the bottom of the bore to the appropriate size, as determined, for example, by a sample standard (28) having a sensing plane (D) which can be sensed by the same sensing elements as those which sense the bore, upon withdrawal of the honing tool carrier through the standard (28).

32 Claims, 2 Drawing Figures

SELF-CONTROLLED HONING MACHINE

The present invention relates to honing machines, and more particularly to machines capable of honing blind bores to an accurate size.

BACKGROUND

When working bores so that they will have an accurate size, that is, an accurate internal dimension, it is difficult to maintain a desired geometry. Typically, such a bore may be a cylinder of a cylinder-piston combination. It is difficult to provide a honing tool which will be vertical throughout the entire travel or length of the bore, so that the bore will be accurately cylindrical. Frequently, the bottom of the bore, that is, the longest feed movement of the honing tool, and particularly if the bore is a blind bore, will be slightly narrower than the open end. This is due to the construction of honing tools which, particularly in blind bores, cannot provide for overrun of the tool.

Many solutions have been proposed to generate accurately dimensioned cylindrical bores; none of them are entirely satisfactory or lend themselves to automatic procedures.

It has been proposed to so construct honing tool carriers that the honing blades or cutters are placed on movable strips. The movable strips are then so arranged that the portion of the strips which will engage the lower part or the end of the blind bore is subjected to a greater degree of operating pressure than the portion of the strip closer to the open end of the bore. In spite of the lack of overrun of honing tools in blind bores, that is, complete passage of the tool through the bore, cylindrical bores can be generated with a high degree of accuracy. The honing tools, however, since they will effectively have greater pressure at the lower end, that is, at the inner end of the blind bore, require use of conical tool elements, and the honing cutters or blades or strips must be relatively short. If the blind bore is shallow, for example when making a brake drum, satisfactory results can be achieved. When making long blind bores, however, for example cyliners of internal combustion engines or the like, two sequential working steps may be used: A first tool having short parallel-arranged honing strips is introduced into the bore with short feed strokes to pre-work an enlargement at the lower or inner end portion of the bore. Thereafter, a second tool with longer parallel honing strips is introduced for final working of the bore to final dimension throughout its length. Such an arrangement requires a double-spindle honing machine, or change of the honing head or tool head on a single-spindle machine.

It has been proposed to utilize a tool which has a set of longer honing strips which can be spread outwardly, to desired dimension, parallel to the axis of the bore, and which additionally has a set of shorter honing strips which can be spread apart either in conical form or parallel to the axis of the bore. The adjustment of the longer as well as the shorter honing strips is independent from each other. Such a tool permits a method of operation in which the longer honing strips are continuously used, the shorter ones, however, are subjected to operating pressure, for example hydraulic pressure, only when the honing tool has reached the bottom of the bore; upon withdrawal of the honing tool, pressure is released. Blind bores of excellent cylindrical character can be made, with the degree of accuracy of the cylinder wall with respect to the axis of the cylinder, especially in the region of the bottom of the bore, depending essentially on feed, workpiece material, applied pressure, and duration of operation, and on the feed path of the longer honing strips which are arranged parallel to the axis of the bore.

Adjustment of the respective operating values, that is, overall feed of the honing tool, pressure of the longer parallel strips, and pressure of the short strips, has to be emperically determined. Adjustment of the apparatus, and operating the honing machine, is done manually, particularly during an initial honing step. It is frequently necessary to correct the adjustment and positioning of the respective honing strips upon first introducing the tool into the bore. This requires a high degree of skill on part of the operator; extensive adjustment and fitting and set-up time are required, and the eventual accuracy depends greatly on the experience and skill of the operator.

It has previously been proposed to utilize an automatic control when honing through-bores by checking the dimension of the bore hole and controlling the overrun of a honing tool through the through-bore in dependence on errors between the actual dimension of the hole which is being honed and a desired or command dimension. It has also been proposed to automatically control honing of blind bores by delaying or retarding the feed of a honing tool and, rather than controlling the overall travel path of a honing tool, to control only the feed of the tool when it reaches the base of the blind bore. Such an apparatus does not operate satisfactorily, however, since, when working blind bores, and particularly those which have an essentially flat bottom, or a very limited central depression or cone tip, honing tools which have only a set of honing strips capable of parallel adjustments will still hone cylinders which are off-size, i.e. slightly narrower in the region of the bottom of the blind bore. The decrease in feed rate which results in multiple and finer material removal is not sufficient and has not been found capable of compensating for the lack of overrun of the entire tool which is possible only through an open through-bore.

THE INVENTION

It is an object to provide a honing machine which is particularly suitable for honing in a workpiece, cylindrical blind bores, which requires a minimum of operator skill and attention; and, in general, insure manufacture of bores which are accurate as to (1) size, and (2) shape, or geometry, throughout their length.

It is an ancillary object to utilize as much of existing technology as possible, so that the machine can be constructed with standard elements, utilizing known components and structures, or which permits upgrading of existing machines to provide automatic, accurate operation, particularly to make cylindrical blind bores.

Briefly, a measuring means is provided coupled to the bore which provides an electrical output signal representative of its actual dimension and geometry. This electrical output signal is compared with a standard or programmed output signal, for example derived by engagement of the honing tool with a standard opening, and a difference signal is obtained which is utilized to control the pressure of application of the shorter blade. The difference signal obtained can also be utilized to control the pressure of application of the longer blade or blade strips of a combination shorter-longer blade strip honing tool, in which the pressure of application of the longer axial strips and of the shorter axial strips is independently controllable. This pressure may, for example, be hydraulic pressure, and the eventual output is a control signal controlling a hydraulic servo valve.

The system permits correction of the pressure of application of the honing tool as soon as any errors in dimension or geometry, with respect to the standard, are discovered. Thus, it is no longer necessary to empirically determine the force of the honing operation during the honing step; rather, the working condition, operating forces, and hydraulic pressures can be matched to the then existing conditions or differences in dimension between desired and actual dimensions. It is, thus, possible to make single-element structures as well as mass-produced serial manufactured items with equal accuracy and without requiring extensive set-up time. Rejects can be reduced to a minimum, and the accuracy of the resulting bores, as well as their precise geometry and size, will be insured.

The apparatus of the present invention utilizes structures and systems which are known in the industry and, for a detailed description of various elements, reference is made to the following: U.S. Pat. No. 4,122,379, U.S. Pat. No. 4,256,999, U.K. Pat. No. 1,370,827, German Pat. No. 19 63 233—short stroke feed, and U.S. Pat. No. 4,173,847.

Determination of the dimension of the bore hole, before and after honing, or of the dimension of a standard sample element, can be done by means of a well known pneumatic measuring apparatus. Measuring nozzles, integrated with the honing tool, provide measuring signals in predetermined axially staggered planes upon each operating or working stroke of the tool. The resulting measured values are continuously fed to a computer electronic system which calculates the deviation of the dimension or the deviation of cylindricity of the bore from a standard or desired dimension, and controls a suitable control electronic system to provide the required command signals in order to them control the force or pressure of application of the respective honing strips which are on the honing tool, and/or the feed of the honing tool into the bore. Additionally, output signals can be obtained to determine the feed stroke, that is, introduction and withdrawal of the honing tool from the bore, or reversal of feed, up or down, from and into the tool, and the instant or position of reversal.

The control system, in accordance with a feature of the invention, is so constructed that, if a predetermined narrowing of the bore in the region of its bottom, close to the blind end, is determined, the application force or pressure for the shorter ones of the strips of the honing tool is increased; if the dimension is greater than a predetermined value, the force applied to the movable honing strips is correspondingly decreased. If the bore, at the edge in the region close to the open end, should be narrower than desired, the overrun travel of the honing tool can be increased; correspondingly, if the region of the bore close to the outer ends is approaching the desired value, that is, is becoming larger, the overrun travel of the honing strips which are positioned in parallel can be decreased.

Comparison of actual and desired or command dimensions is preferably done by utilizing the same sensing apparatus and comparing the bore with a cylindrical element of standard or ideal dimension. This comparison can be carried out after any one of the workpieces has been worked on; deviations from an externally commanded dimension, which may occur for example due to wear on the standard upon engagement with the honing tool, can be compensated and introduced into the computer system by electrical correction signals. Thus, a standard can be used which may not accurately reflect the ideal or theoretical dimension itself, yet provide, by electronic correction of the signals derived therefrom, ideal, theoretically perfect standard or comparison command signals. The signals themselves are derived from the same sensing element which senses the bore in the workpiece. Drift of the system, for example due to temperature and the like, can be further compensated by a zero-set calibration and recalibration arrangement which, after each working operation, resets the system to a predetermined command or "null" level.

Deriving electrical control signals also permits easily to derive actual electrical dimension signals. In accordance with a feature of the invention, it is thus possible to record the finally determined actual measuring values, representative of the actual shape and dimension of the finished honed bore, and utilize the so derived data for statistical evaluation. The data can be applied to a second computer system which can, by and itself, determine the necessary data for statistical quality control, and supply the data to a suitable printer or tape memory, which provides output signals representative of statistical characteristic values or can store these signals for further processing. This permits recording and later evaluation of the operating effectiveness of the machine for subsequent education or revision of procedures. This has substantial advantages, for example shorter set-up time for further operations, less scrap or off-size output, and optimizing of the machining results by changing operating parameters upon detection of off-size work. Also, the data can be stored for further resetting of the machine if, after a change in set-up, a previously well-made workpiece is to be duplicated. The stored data can merely be read-out and transferred to the system for automatic control of the honing machine and the process of operation. Specific data with respect to individual workpieces can be associated therewith so that, for example, a particular dimension of a particular honed cylinder bore can be used for accurately manufacture of a matching piston therefor.

DRAWINGS

Figure 2:
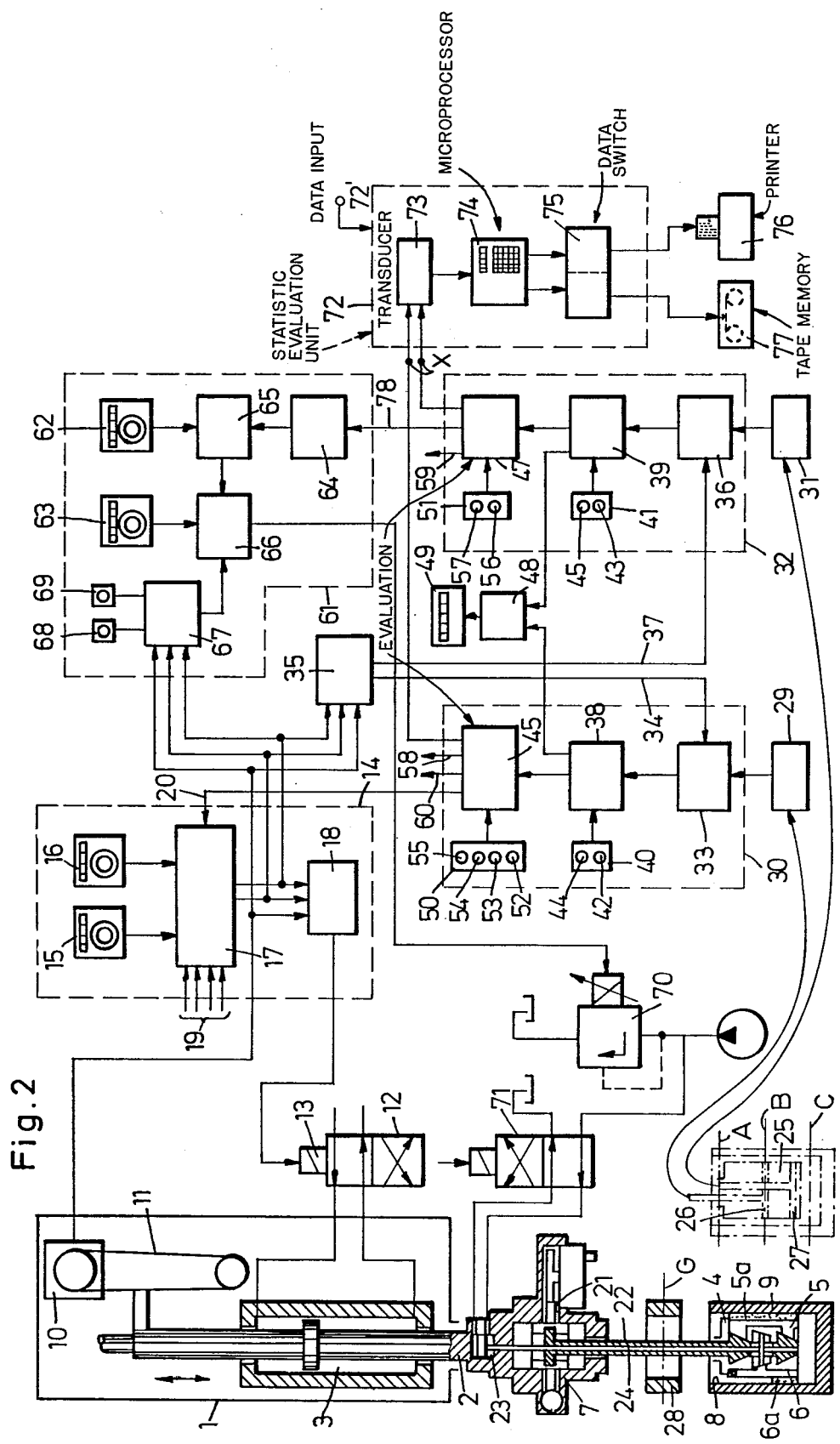

FIG. 1 shows, in highly schematic representation, a section through a honing machine, and the electronic and hydraulic control system therefor, in schematic block representation; and FIG. 2 shows, in block representation, the honing machine of FIG. 1 in combination with a statistical evaluation unit.

The honing machine 1 has a spindle 2 which is movable up-and-down by a cylinder-piston system 3, in the direction of the double arrow A. The spindle 2 is rotated by a suitable rotary drive, as schematically indicated by the rotating arrow B, to rotate about its longitudinal axis. The spindle 2 has a honing tool carrier 4 secured thereto on which separate honing strips 5, 6 are arranged. The honing strips 5 have a substantial axial extent, as seen in FIG. 1, whereas the honing strips 6 are substantially shorter, and are located close to the bottom of a blind bore 8 in a workpiece 9. The honing tool strips 5, 6 can be radially positioned by a positioning apparatus 7, for external projection from the tool carrier 4. The strips 5 and 6 are independently adjustable by the apparatus 7.

An actual feed transducer 10 is coupled to the spindle 2 to move therewith. As shown, the actual feed transducer 10 is a chain drive 11 which is moved back-and-forth by the up-and-down movement of the spindle 2. Other actual feed position transducers can be used; for example, it is within the scope of the system to provide for an inductive, capacitative or photoelectric sensing apparatus to determine the actual position of the spindle and to provide representative output signals in digital or in analog form.

The piston-cylinder feed drive 3 of the spindle 2 is hydraulic and controlled by control of hydraulic fluid by a magnetic valve 12 which has an electrical control coil 13 which is selectively controlled from a feed control unit 14.

The feed control unit 14 can be any well-known electronic control unit, for example of the type described in the referenced U.S. Pat. Nos. 4,122,397 and 4,256,999; the described units operate in analog mode. Digital control units may also be used. The feed control unit 14 is described only briefly since such units are well known in the industry. Essentially, the unit has two command potentiometers 15, 16, a correction unit 17, and a comparator and evaluation unit 18. The command potentiometers 15, 16 are set manually to determine the desired reversal points of the spindle 2. Preferably, they are supplied with a digital button which permits exact adjustment. Corresponding to the setting of the respective potentiometers 15, 16, or of a corresponding digital input, the potentiometers 15, 16 provide output signals, in analog or digital form, to the correction unit 17. The correction unit 17 receives a plurality of inputs 19 which provide operating parameter input signals. These parameters are representative, for example, of turn-on feed speed retardation, changes in feed speed due to changes in temperature of the hydraulic control fluid, cutting fluid, feed speed, changes in input power, and the like. An additional input to the correction unit is provided at terminal 20 for a signal which is representative of the geometry of the workpiece. Thus, the correction unit modifies the command signals in dependence on the respective then pertaining operating parameters as determined by the signal inputs 19 and the workpiece geometry on input 20.

The output from the correction unit is applied to a comparator and evaluation unit 18 which compares the actual position and feed movement signal derived from transducer 10 with the command signal, as corrected, and derived from the correction unit 17. The actual then pertaining position of the spindle 2 thus is fed in from the actual feed transducer 10 and, when the upper or lower reversal points are reached, as modified by the correction unit 17, the feed is reversed by suitable control of the magnetic valve 12, 13. Upon correspondence or coincidence of the signals from the correction unit 17 and from the actual feed transducer 10, the comparator and evaluation unit 18 provides the necessary control signal which triggers change in direction of the feed applied to the spindle 2. U.S. Pat. No. 4,256,999 describes this system, now well known in the industry, in great detail.

The feed control unit 14 can operate just as well in digital mode, or can be a combined, hybrid analog-digital unit, as well known in control technology. The command inputs 15, 16 can be manually set, or can be provided by automatic machine tool control, for example from a data memory, a computer, or numerical machine tool control units, for example.

The apparatus which positions the honing strips of the honing tool head 4 is well known in the industry, and a detailed description thereof is found, for example, in U.S. Pat. No. 4,173,847. Essentially, a hydromechanical operating mechanism 21 is provided which, intermittently and preferably in steps, supplies hydraulic fluid through a supply tube 22 in order to effect, in steps, expansion of the longer honing strips 5, which have honing strip blades or cutters 5a secured thereto. The positioning system 7 has a second, independently operating mechanism 23 which is formed by a cylinder bore and a hydraulic piston, and which controls, over a control rod 24 positioned within the pipe 22 supplying hydraulic fluid to the strips 5, the short honing strips 6 which have honing cutters or cutting elements 6a thereon.

In accordance with the invention, the short honing strips 6 are controlled in accordance with the geometry of the workpiece; in other words, the control of the radial expansion or projection of the set of cutter strips 6, to which the actual cutters 6a are connected, are automatically controlled by the then pertaining dimension of the workpiece.

The honing tool 4 has two measuring elements 26, 27 thereon. For clarity of the drawing, and to prevent confusion, the measuring system of the honing tool 4 is shown in chain-dotted line adjacent the cross-sectional view of the tool in the workpiece. The measuring device itself is known and may be replaced by an electrical or an electromechanical sensing element. As shown, a pneumatic sensing element or measuring device 25 is used. The measuring device has two diametrically opposed measuring nozzles. The first set of nozzles corresponding to the measuring position 26 is located approximately in the center of the axial extent of the tool 4; the second measuring position 27 is located close to the lower end of the tool 4, that is, the end of the tool which will be close to the blind bore end of the bore 8 in the workpiece 9.

In accordance with a preferred form of the invention, an additional comparison measurement is carried out by utilizing the same measuring positions 26, 27 with respect to a measuring standard of known size. To provide for this measurement, a check or standard ring 28 is located axially above the workpiece.

Measuring: The measuring position 26 first determines the standard dimension SG in the measuring plane G on the standard 28. The tool 4 is then continued to be lowered and introduced into the workpiece. At the plane A in the bore 8 of the workpiece, a workpiece dimension WA will be established. Upon further introduction of the tool 4, a workpiece dimension WB is derived at the plane B of the workpiece. The measuring position 27, likewise, first senses the standard dimension SG in the plane G, then the dimension of the workpiece in plane A, then in plane B (workpiece dimension WB), and finally, and in addition to the position 26, the dimension of the workpiece WC in the plane C, close to the bottom of the bore 8.

Pneumatic-electrical transducers 29, 31 are connected to the nozzle openings of the pneumatic nozzles in the positions 26, 27. Transducer 29 receives the sensed signal from the position 26 and provides a corresponding electrical output signal, which is applied to a control unit 30. Likewise, transducer 31 furnishes an electrical signal derived from measuring position 27, which is applied to control unit 32.

Control units 30, 32, preferably operate electronically. Essentially, they include the following units are elements: Memories 33, 36; computer electronics 38, 39 and evaluation circuitry 46, 47. The evaluation units 46, 47 are connected to limit set input units 50, 51; the computer 41 is connected to a calibration and correction input 43, 45 and the computer unit 38 to a calibration and correction input 40, 42, 44. Display and selection units 48, 49, likewise, are connected to the computers to provide, selectively, as determined by a switch setting 48, an output display of the respective calculations being carried out by the computers 38, 39. The memories 33, 36 operate also as comparators by storing information derived from measuring of the standard dimension SG and subsequent comparison of the stored value with actual measured dimensions as the tool head 4 with the measuring positions 26, 27 is introduced into the workpiece 9. Of course, rather than using a measuring standard 28, command inputs may also be supplied to the memories 33, 36 to be stored therein for comparison with the data derived from the workpiece as applied thereto in the form of signals from transducers 29, 31.

Operation: A workpiece 9 has a bore 8 formed therein which is to be honed. The workpiece is secured to the table of the honing machine, as well known. Upon turning the machine ON, from a machine control (not shown), a signal is provided which will initiate the first measuring step, starting, always, to derive the initial standard measuring signal SG, in the plane G. This resets the control unit to null or zero, or to a predetermined "standard" position. Thereafter, the honing step under automatic control will be initiated.

The magnetic valve 13 is energized to provide for hydraulic fluid to the cylinder-piston combination 3 which will feed the honing tool head 4 into the bore 8 of the workpiece 9, for movement, up-and-down, between limits determined by the feed control unit 14. Simultaneously, the honing spindle 2 is rotated—see arrow B—and the honing tool strips 5, 6 can be set for the appropriate diameter of the bore hole 8. Upon initiation of the honing process, the dimensions of the bore hole 8 already present in the workpiece are likewise sensed to provide output signals WA, WB, WC, respectively.

During the entire honing process, continuously, the measuring positions 26, 27 provide respective signals representative of measured values to the transducers 29, 31 which convert the respective signals into electrical output signals representative of the dimensions which are sensed, and apply these signals to the memories 33, 36. Control lines 34, 37, connected to a feed comparator 35 which, in turn, is connected to the operating parameter unit 14, provide information with respect to the measuring plane or, respectively, the stroke or feed of the spindle 2. The value of the dimension derived from the transducers 29, 31 is entered in the respective memories 33, 36 at that instant of time or, respectively, position, in which the respective measuring position 26, 27 passes the respective measuring planes A, B. Accordingly, the measuring values introduced into the memories 33, 36 are entered at exactly that period of time when the respective measuring position 26, 27 passes the corresponding measuring planes A, B, C, as the case may be.

In accordance with a preferred feature, the memories 36 are reset each time the head 4 passes through the measuring standard 28; thus, it is desirable to reset the signal to the value SG when the head 4 passes the measuring plane G, for example then setting the memory to zero or null, and adding the difference, with proper sign, to the workpiece signal values WA, WB from position 26, and WB, WC from position 27, respectively, in the respective memories 33, 36. This prevents drifts in the measuring system and compensates any possible drift, automatically, so that deviations of the measuring values which may occur due to temperature or other external effects are automatically compensated. Sensing and determination of the standard dimension in the standard measuring plane G is done upon initiation of any working step of a workpiece 9, that is, each time the honing tool head 4 is introduced into, and removed from the workpiece. The computers 38, 39 are connected to calibration and correction units 40, 41 which, respectively, have correction input knobs or keyboards 42, 44 and 43, 45, respectively. The correction and calibration units 40, 41 permit entry of correction data with respect to the measuring standard 28. For example, correction knob or keyboard 42 or 43 can compensate for variations in the measuring standard ring 28 from a theoretical or design value if, for example, the ring 28 already is offsize from the ideal value. The correction inputs 44, 45 can provide corrections allowing for changes to be entered into the dimension at the measuring plane A, for example, and the correction to be entered by knob or keyboard 45 may provide a signal for correction of the dimension in measuring plane C. Of course, additional correction entries for correction on the plane B can be applied both to the units 40, 41 if desired. A correction input by knobs or keyboards 42, 43 is then desirable, or possibly even necessary, if the standard ring 28 no longer has the ideal theoretical dimension, for example due to contact with the honing cutters 5a, 6a. A correction input thus can be provided by shifting the measuring plane G in level, so that the comparison with the workpiece measuring planes A, B and C will change. The correction value is used to modify the measuring signals derived from the memories 33, 36, for example by algebraic addition.

The measuring signals—corrected if necessary as aforesaid—provide an exact analog of the deviation of the workpiece from a predetermined ideal or design workpiece dimension, which has the desired precise and exact measurements and the desired geometric shape which, for example, and typically is exactly cylindrical.

It is also possible to provide an entry in the calibration and correction unit to control the honing tool in such a manner that the honed bore 8 will have a shape different from a cylindrical one, while still using a cylindrical measuring standard 28. In order to provide a different design shape to the honed bore 8, the correction knobs or keyboards 44, 45 can enter the desired deviations in the respective measuring planes A, corresponding to the open end of the bore and C and the base of the bore with respect to the average or central plane B, in the middle of the bore. The values set for the measuring plane A are then associated with the measuring signal WA of the workpiece; likewise, the measuring signal WC from the workpiece is associated with the measuring plane C. The correction values, entered in the calibration and correction units 40, 41 in the form of electrical signals, are then used to additionally modify the signals in the respective computers 38, 39, for example by algebraic addition.

The computers 38, 39 then calculate the difference in the signal values derived from the measuring planes B and A, for example by a subtracting circuit therein, mathematically: WB−WA. The computer 39 calculates the difference of the measuring signals derived from the measuring planes B and C, mathematically: WB−WC. These difference values then determine the deviation from the predetermined command shape or size or dimension. The calculated values and the actual measured values are supplied to the evaluation circuits 46, 47, respectively. Additionally, the values can be displayed in a display device 49, upon being selectively connected thereto by a selection circuit 48 which, in its simplest form, is a transfer switch. The display device 49 may operate in analog or digital mode.

The evaluation stages 46, 47 each are connected to input units 50, 51, respectively, to permit entry of limit values. In the example given, the evaluation circuit 46 has limit set inputs 50 connected thereto. The limit set 50 has an input unit, for example a control knob coupled to a potentiometer, a digital input by keyboard or repetitive key operation, dial, or the like, to provide a limit value for the feed at the top dead center (TDC) or reversal position of the honing tool or, rather, of the feed mechanism therefor. Thus, a maximum correction at the TDC position can be determined. Further, an input 53 is provided to furnish a signal representative of the limit for the correction of the parallel honing cutter strip 5 if the bore hole is off-size. An input 54 provides a limit to determine off-size or reject size if the upper portion of the workpiece bore cannot be honed to appropriate size; an input 55 provides a limit for reject recognition of the dimension of the interior of the bore. The limit set unit 51 includes an input 56 to provide a limit for the application force correction or application pressure correction for the shorter honing strip set 6 and an input 57 to determine the limit which would result in rejects upon sensing of off-size or improper size of the bore in the lower portion of the workpiece. Thus, the input units 50, 51 permit setting of limits beyond which a workpiece is considered to be out-of-gauge and to be rejected.

The signal difference values WB−WA, determined by the computer 38, is applied to the evaluation circuit 46 and there compared with the limit value as set by the input knob 52 of the limit set unit 50. If the predetermined limit for deviation from the command value is exceeded, a signal is derived from the evaluation circuit 46 which is applied to the input of the feed control unit 14 to thereby correct the feed and, for example, shift the TDC position of the honing tool. For example, if the measured difference WB−WA is positive, that is, if the plane B has a measured value which is higher than that derived from the plane A, correction of the TDC or reversal point of feed upwardly, is indicated, which means lengthening of the feed. If the measured value is negative, the feed stroke is shortened, that is, the correction is effected downwardly.

The signal difference value WB−WC computed by the computer 39 is applied to the evaluation circuit 47 for comparison with the inputs derived from the input potentiometer or keyboard 46. If the limit for deviation from shape or size is exceeded, the evaluation circuit 47 provides a signal to the input of the honing force control unit 61 which—as will appear further on—effects correction of the application force or application pressure for the set of honing tool strips 6. If the measured difference WB−WC is positive, that is, if the value measured in a plane B is greater than the measured value in the plane C, correction of the application pressure is towards increase, that is, an increased pressure or force is applied to the honing strips; if the measured value difference is negative, the pressure is decreased.

The evaluation circuits 46, 47 additionally compare the respective measured value difference WB−WA or WB−WC in accordance with limit values set by the limit set control inputs 54, 57, respectively. If the off-size exceeds a predetermined limit value, necessary for recognition of a reject, the evaluation circuits 46, 47 will provide on outputs 58, 59 a signal which is connected to the machine control (not shown) to characterize the particular workpiece as a reject, for marking or separate handling in a reject bin, and removal of the workpiece from the normal production path.

The evaluation circuit 46, receiving the measured value WB from the computer 38, also compares a limit set by the input 53, or 55, respectively. If the value WB exceeds the limit set by the input 53 for readjustment of the positioning of the longer honing strips 5, a signal is derived from the evaluation circuit 46 over output line 60 to control the longer parallel honing strip set 5 to effect appropriate correction. A maximum correction can be set by the maximum limit set 55; if the measured value WB, due to excessive dimensional difference, exceeds the limit value set by the input 55, a reject element is recognized and the evaluation circuit 46 likewise provides a "reject" signal at its output terminal 58 for appropriate marking or separate handling of the respective workpiece as a reject element.

In accordance with a feature of the invention, the lower or shorter honing tool cutters 6a on the honing tool strips 6 are controlled by a honing force control unit 61 which, preferably, is an electronic unit having, essentially, the following components: honing force set input units 62, 63, a correction unit 64, preferably with a maximum correction set control 64', an adder 65, and a switching unit 66. Further, a feed path comparator 67 is provided to which up-and-down feed set inputs 69, 68 are connected in order to be able to permit introducing, manually, or by numerical control, switching points dependent on feed stroke or path.

The honing force set control 62 may be a potentiometer, a digital input or the like. For example, an input knob providing digital output can be used on which a desired working force for the lower or shorter set of honing strips 6 can be controlled. This input provides a signal which is applied over an adder 65 to the switching circuit 66 for control of a servo valve 70. The servo valve 70 provides a hydraulic pressure which is an analog of the signal applied thereto in order to control the magnetic pressure of the adjustment mechanism 23 for the honing strip set 6 through the magnetic valve 71 which, in turn, controls the hydraulic flow to the unit 23. A control terminal 71' is connected to the valve 70 to provide ON/OFF control of the hydraulic fluid.

The honing force or pressure is connected or disconnected in dependence on the feed stroke of the tool head 4. Pressure is turned ON when the comparatively short honing cutter 6a of the set of honing strips 6 already is introduced into the region of the bottom of the bore 8; pressure is released when the honing cutter 6a has traveled upwardly beyond the bottom region. Connection and disconnection of pressure is controlled by a stroke path comparator 67 connected to the feed control unit 14. The feed comparator 67 is connected to the inputs 68, 69 which permit manual or numerical or program-controlled input of the stroke for honing of the bottom of the bore 8. The feed comparator 67 receives a signal which is representative of the instantaneous stroke or instantaneous position of the honing tool. This information can be derived by any well known and suitable positioning element, for example a contactless or microswitch control taken off the feed of the spindle 2 of the honing machine or derived, for example, from the actual feed transducer 10.

When the shorter honing cutter 6a reaches the bottom of the bore hole, at a limit position as set by the input unit 68, the feed comparator 67 provides a signal to the switching unit 66 which causes the working force pressure to be applied. If, after the honing tool 4 is moved upwardly towards the open end of the bore, the position or level set by the input 69 is reached, the feed comparator 67 provides a second or OFF signal to the switching circuit 66 in order to disconnected working force and hydraulic pressure to the unit 23 by suitable control of the valve 70 and hence of valve 71.

In accordance with a feature of the invention, the honing cutter strips 6a are held in surface contact with the inner wall of the bore 8 even after the working pressure has been released. A predetermined remainder of force is retained. The value of this remaining pressure or force, which can be termed "contact pressure", will normally be substantially lower than working honing pressure. It can be preset by the input unit 63 to provide a signal corresponding to the setting of unit 63 which is applied to the switching unit 66 for subsequent connection to the servo valve 70. The servo valve 70 thus will not completely release pressure, but rather retain the holding or contacting pressure as determined by the input from honing force set input unit 63. This engagement pressure can be so selected that the tool remains in contact without, essentially, removing any material from the workpiece.

If the measuring position 27 determines excess dimension with respect to the limits set by the input unit 56 and applied to the evaluation unit 47, as applied to the memory 36 over the transducer 31, a signal is derived from the evaluation unit 47 which is applied to the correction unit 64 of the honing force control unit 61. This signal modifies the honing force signal as set in by the input unit 62, by being combined with the input signal in the adder 65, so that the signal applied to the switching unit and hence to the valve 70 is changed. Correspondingly, the pressure in head 4 which controls the honing force of the cutter strips 6a will change in dependence on the deviation of the measured value sensed by the measuring position 27 with respect to the set input as determined by the limit set input 56 of limit set input unit 51.

The measuring positions 26, 27 may determine that the bore of the workpiece 8 close to the bottom is narrowed by an extent which exceeds a predetermined limit. Under those conditions, the signals applied by the control unit 32 to the honing force control unit 61 will cause the pressure and hence the honing force to be applied to the honing cutter strip 6a to increase. This causes an increase in material removal at the base or bottom of the bore 8 until the signals again are within the predetermined limits or boundaries. As a consequence of increased material removal, the sensing or measuring position 27 will determine that the bore 8 is now wider; upon such determination, and processing of the respective signal in the control unit 32, the honing force will be decreased by decrease of the pressure applied as controlled by valve 70.

The level of increase in honing pressure, or decrease thereof, based on the value of the correction signal derived from the control unit 32 preferably, and in accordance with a feature of the invention, can be set by an input unit 64' coupled to the correction unit 64 to provide a maximum correction limit. This permits excellent matching of the control system to particular bores of different diameters, and to the particular materials of the workpieces involved.

Embodiment of FIG. 2: The system of FIG. 2 in all essential respects is identical to that of FIG. 1, and same elements have been given the same reference numerals. Since the basic system is identical, the identical components have not been labeled therein.

In addition to the system of FIG. 1, the evaluation units 46, 47 provide outputs over additional output terminals X to a statistical evaluation unit 72. The signal values, as computed by the computers 38, 39, and evaluated by the evaluating circuits 36, 37, thus are applied to unit 72 where they are processed in a microprocessor 74, then applied to a data switch 75 for output in a printer 76 or to be stored, for example in a tape memory 77. Other types of data processing and display units, for example a display terminal, may be used, coupled to or separate from the printer 76 or the memory 77. The evaluation unit 72 permits statistical processing of the data derived from the evaluation units 46, 47. In the example given, the measured signals WA, WB and WC, as well as the difference values WB−WA and WB−WC, are processed in the statistical evaluation unit 72 for subsequent storage and output.

The statistic evaluation unit 72 can, like any signal processing apparatus, operate in digital or analog mode. In preferred form, a digital apparatus is used. Essentially, it includes a transducer 73 coupled to the output terminals X, X from the evaluation units 46, 47 which matches the signals derived from the evaluation units 46, 47 to the subsequent signal processing stages 74, 75, 76, 77 in the statistic evaluation unit 72. The transducer 73 is connected to a microprocessor 74 which, in accordance with its programming, stores and provides a statistical output of characteristic values of the measured actual bores of the workpieces 9 for subsequent quality control. The processed outputs associated with batches or individual ones of the workpieces, together with sensed or measured values and, if necessary, additional data which can be introduced thereinto from an external terminal 72', are applied to the data switching unit 75 for display on printer 76, storage in the memory, or the like. Inputs to terminal 72' may, for example, be of specific model or serial numbers of the workpieces, date, time, time of measuring, temperature, or other external inputs. The microprocessor 74 associates the data with respect to the workpieces or groups of workpieces and, in accordance with its program, provides a suitable output format to the printer 76 and the tape memory 77. Of course, other memories or displays or outputs may be used.

Storage of measured values and association therewith on punched tape, magnetic tape or other data carriers has the advantage that the data can be further processed externally of the honing machine. For example, the honing machine in accordance with the invention provides output data which can permit manufacture of an exact matching counterpiece on a different machine. For example, a specific honed diameter of the bore 8 may represent the diameter of a cylinder; this diameter can be used for precise grinding of a piston to fit into the cylinder on an external, for example centerless, grinding machine. Thus, a piston can be ground to exactly match the exact diameter of the honed bore 8; matched pieces can be readily associated with each other by associating the data applied by the evaluation units 46, 47 with a particular workpiece.

To manufacture matching pieces, the workpieces are associated together in carriers, on trays or the like, in groups for handling in groups. Close tolerances associated with the respective groups can thus be maintained. The data carriers, for example punched strips, then can carry the number of the storage element or bin, or other characteristics for the particular group, as well as the remaining variables—date, time, temperature at measuring, operator, and the like. The data or record carriers, with the corresponding measured values, can then be applied—also in groups—to an external grinder to make precisely fitting counter-elements to fit into the honed bores.

For certain specific applications, it is desirable to utilize a feed stroke delay or retardation control with the honing machine. Such retardation controls are known in the industry. On such retardation control is described in detail in the referenced British Pat. No. 370,827. Combination of retardation control and short stroke control may also be desirable in certain applications. A short stroke feed control is described in the referenced German Patent DE-PS No. 19 63 233.

If short-stroke or delayed or retarded or slowed stroke of feed is to be used, the control units described can be additionally modified by introducing into the control units 32 a correction value, for example to the computer 39, or to introduce a correction value to the adder 65 to increase or decrease the honing pressure for the shorter honing strip 6, simultaneously with an increase or decrease, respectively, of the time while the honing stroke is effective. Likewise, an increase or decrease of the number of stroke oscillations or short strokes can be matched to the honing pressure by introducing a corresponding correction signal, similar to the limit set or calibration signals introduced by units 41, 51, respectively.

Various changes and modifications may be made; for example, by simple additional connection or modification of the system, honing tools which have two sets of parallel honing cutter strips can be used. The output signal applied from the honing force control unit 61 can be equally applied for parallel short honing strips or also for longer honing cutter strips, as desired.

The honing feed stroke control can be as desired, and as well known in the industry, and any suitable feed stroke system can be used. The respective measured values can be obtained not only pneumatically, as shown, but also in any other suitable and desirable manner, for example electrically, capacitatively, or the like; the signals can be evaluated electromechanically or hydraulically. In a preferred form, however, the evaluation is electronic, as described in detail. Digital signal processing technology is particularly appropriate; digital signal processing can be mixed, however, with analog signal operation. Upon digital operation, any desired working speed can be obtained by serial or parallel signal handling and by utilization of appropriate attachments, as well known in the electronic signal processing field. Clock generators to provide synchronization, of course, will then be provided so that all signals will appear at their proper time in the proper processing units. Such elements are not shown or described in the present application since they are well known in the electronic data handling field and can be applied in accordance with known digital machine tool control technology.

I claim:

1. Honing machine for honing of bore holes (8) in a workpiece (9) having
    a honing tool carrier (4);
    at least one long honing blade (5,5a) having an axial extent corresponding at least approximately to a major portion of the depth of the bore hole, located on the carrier;
    means (7,21,22) positioning the radial projection of the at least one long honing blade;
    at least one short honing blade (6,6a) having an axial extent corresponding to the lowermost portion of the bore hole, located on the carrier;
    short blade positioning means (7,23,24) positioning the radial projection of the at least one short honing blade;
    means (3) for reciprocating the tool carrier (4) and hence the honing blades within the bore hole (8);
    and comprising, in accordance with the invention,
    measuring means (25) coupled to the bore (8) in the workpiece (9) and physically moving with the honing tool carrier (4) positioned in the region of the at least one short honing blade (6,6a) and including a measuring sensor (27); said said sensor (27) being located close to the end of the at least one short honing blade adjacent the bottom of the bore, and sensing the actual diametric dimension (WB, WC) of the bore hole in at least two planes (B,C) extending transversely to the axis of the hole, and providing, sequentially, sensing signals representative of the actual dimension and and geometry of the bore at the respective planes;
    and control means (32,61,70) including
    memory means (36) storing the sequential sensing signals and
    control signal generation means (39) for generating difference control signals as a function of the sensed dimensions as represented by said sequentially sensed signals at the respective planes (B,C),
    said control means being coupled to the short blade positioning means (7,23,24) and controlling the pressure of application of the at least one short honing blade (6,6a) as a function of the difference between the sequential measurement signals derived from said sensors and representative of dimension and geometry of the bore.

2. Machine according to claim 1, wherein the sensing elements of the measuring sensors comprise pneumatic sensors.

3. Machine according to claim 1, wherein the measuring sensors are located on predetermined planes (A, B, C) on the carrier to sense the diameter of the bore at said predetermined planes.

4. Machine according to claim 1, including means for providing a standard or desired measuring dimension comprising a standard sample element having a bore of standard comparison diameter therethrough;
    and a measuring plane (G) extending transversely of said standard bore, adapted to be sensed by the measuring sensors.

5. Machine according to claim 1, further including a measuring transducer element (31) coupled to the output of the measuring sensor and providing electrical signals representative of measured dimension of the bore by said measuring sensor;

and wherein the control signal generating means includes
computation and evaluation units (39,47) connected to said memory means (36) and forming with said memory means, the control unit (32) receiving the output signals from said measuring transducer element (31), and providing machine-accepatable output signals to said blade positioning means.

6. Machine according to claim 5, wherein said control units include means (40, 41; 50, 51) coupled thereto and receiving limit set and calibration input signals to modify and limit the machine-acceptable output signals to predetermined limit values.

7. Machine according to claim 5, wherein said control units comprise two channels (30, 33, 38, 46; 32, 36, 39, 47);
two measuring transducers (29, 31) are provided, one each coupled to a respective channel;
and wherein each one of the channels controls the pressure of application of a respective one of the long (5) and short (6) honing blades.

8. Machine according to claim 7, wherein the measuring sensors are separately associated with the long (5) and short (6) honing blades, the outputs from the respective separate measuring sensors being transmitted to respective separate measuring transducers (29, 31) for application to the respective channels (30, 32) of the control units.

9. Machine according to claim 5, wherein the control unit includes a memory (36) forming said memory means;
the control signal generating means comprises
a computer (39), processing the compared signals and converting said signals into machine-acceptable form;
and an evaluation stage (47) to provide said machine-acceptable output signals;
and wherein the memory (36) is reset to null or zero upon sequential measurements of sequential workpieces to eliminate drift in the operation of the control units.

10. Machine according to claim 5, further including feed sensing means (10, 11) providing signals representative of feed of the honing tool carrier into the bore; and a feed control circuit (35) providing feed signals, and hence position signals of the honing tool carrier (4),
said feed control circuit being connected to and providing honing blade position signals at the respective planes (B, C) to the memory means (35) to associate the measurements derived from measuring means (25,27) with predetermined positions of the measuring means in the bore.

11. Machine according to claim 9, further including manual correction and calibration input means (40, 42, 44; 41, 43, 45) connected to the computer.

12. Machine according to claim 8, wherein separate, individually adjustable limit set means (50, 52, 53, 54, 55; 51, 57, 56) are connectable to the respective channels to permit external entry of data representative of limits of operating parameter of the machine, and positioning of the respective honing blades (5, 6), and to modify the machine-acceptable output signals by inhibiting said signals from exceeding said limits.

13. Machine according to claim 12, wherein the limit set means (50) of the channel (30) controlling the position of the long (5) honing blade comprises first limit input means (52) setting a limit for the maximum travel of the honing tool carrier at the open end of the bore (8) of the workpiece (9);
a second limit input means (53) to adjust the radial position of the long honing blade (5);
a third limit input means (54) providing a signal representative of excess dimension of the bore, as sensed by the measuring means, and to determine reject or excessive tolerance of the bore.

14. Machine according to claim 12, wherein the limit set means coupled to the channel (32) processing the signals controlling the short honing blade (6) comprises
fourth limit input means (56) providing limit input signals for the radial positioning of the short honing blade;
and fifth limit input means (57) providing a signal representative of excess dimension of the bore at the bottom thereof as sensed by the measuring means (27) associated with the short honing blade to determine reject or excessive tolerance of the bore adjacent the bottom thereof.

15. Machine according to claim 14, wherein said forth limit input means (56) provides a limit for conical positioning of the short honing blade.

16. Machine according to claim 8, further including a feed transducer system (10, 11) coupled to the tool carrier and determining the actual position and feed of said tool carrier (4);
a feed control stage (14) receiving, as an input, said actual tool position and feed;
command means (15, 16) providing command signals controlling commanded feed;
feed operating means (3, 12, 13) connected to and controlled by said feed control stage;
a correction stage (17) connected to said command means and forming part of said feed control stage to receive correction signals and modify the command signals from said command means;
and said correction stage (17) being connected (22) to receive correction signals from the one of said channels to modify the commanded feed as a function of sensed dimension, as processed by the respective channel (30, 32) of said control units.

17. Machine according to claim 8, including a honing force control unit stage (61) forming part of said conrol means for controlling the pressure of application of the at least one short honing blade, said honing force control unit stage being connected to receive control signals from the channel of the control unit (32) coupled to the measuring means (27) associated with the at least one short honing blade (6), said honing force control unit stage providing output signals to said short blade positioning means (23, 70, 71) positioning the at least one short honing blade (6) on the tool carrier (4).

18. Machine according to claim 17, wherein the honing force control unit stage (61) includes a correction unit (64) for modifying the signals processed in the honing force control unit stage in accordance with predetermined correction inputs to thereby limit the force or pressure of application of the short honing blade.

19. Machine according to claim 17, wherein the control means controlling the pressure of application of the short honing blade comprises a hydraulic control valve (70) coupled to and receiving the control signals from the honing force control unit stage;
and wherein the channel (32) associated with the measuring means (27) measuring the cutting effect of the short honing blade (5) is additionally connected to modify and control the feed of the tool carrier.

20. Machine according to claim 1, including
a feed mechanism (3, 12, 13) and a feed control unit (14) therefor effecting and controlling feed of the tool carrier (4) into the bore;
wherein the control means controlling the pressure of application of the at least short positioning blade comprises hydraulic blade positioning means (70, 71);
and wherein said control means controlling the pressure of application of the at least one short honing blade comprises one individual measuring channel (31, 32; 36, 39, 47) including a honing force control unit stage (61) coupled to the measuring sensor (27) associated with the short honing blade (5), said channel providing control signals (59) to the feed control unit and to the hydraulic blade positioning means (23, 70, 71).

21. Machine according to claim 20, wherein said honing force control stage comprises honing force set command input means (62, 63) to provide preset or commanded honing force or pressure values;
a correction stage (64) and limit means (64a) to introduce predetermined limits to honing force pressure;
feed command input means (68, 69) and a feed comparator (67) comparing commanded feed and actual feed as determined by the feed control unit;
and switching means (66) connecting control signals to the hydraulic blade positioning means in dependence on commanded force and under actual operating conditions of the machine, and connect or disconnect application of hydraulic pressure and hence of honing force in dependence on feed of the tool carrier to which the short honing blade is secured.

22. Machine according to claim 21, wherein the honing force command input means comprises an input transistor (62) and an adder (65), the adder algebraically combining the honing force signals as processed by the channel (31, 32) of the control unit and introduced signals representative of predetermined honing forces, and furnishing an output signal which will be the output signal to the switching unit (66) for subsequent control of the hydraulic blade positioning means during honing and feed of the honing tool carrier in operation of the machine.

23. Machine according to claim 20, wherein the feed comparator (67) and the switching unit (66) are interconnected, the switching unit switching OFF or interrupting application of a honing force or pressure command signal upon sensing of movement of the tool carrier in a direction opposite to tool feed and representing movement of the tool carrier out of the bore.

24. Machine according to claim 21, wherein the honing force set command input means comprises a minimum set element (63) connected to the switching unit to provide a signal representative of honing pressure which is slightly less than that honing pressure required for minimum material removal from the workpiece.

25. Machine according to claim 20, wherein the output of the measuring channel (31, 32) and applied to the correction unit (64) provides an essentially continuous correction value in dependence on measured deviation of the bore, as determined by said measuring means (25, 27) from desired dimension.

26. Machine according to claim 8, further including (FIG. 2) a statistical evaluation unit (72) having a microprocessor (74) and a data switching stage (75);
data storage and recording means (76, 77);
and wherein said statistical evaluation unit is connected to receive the output from said channel (30, 32) for statistic evaluation of size of the bores of the workpieces, as sensed by the sensing means, signal processing, and recording of respective measured dimension in association with at least one workpiece (9).

27. Machine according to claim 1, further including a tool carrier feed mechanism (3, 12, 13), and a feed control unit (14) therefor, controlling application of feeding force to the tool carrier;
and wherein said feed control unit comprises command means and means (17) delaying or interrupting feed of the carrier (4) for predetermined time periods.

28. Machine according to claim 1, further including a tool carrier feed mechanism (3, 12, 13), and a feed control unit (14) therefor, controlling application of feeding force to the tool carrier;
and wherein said feed control unit comprises command means and means (17) for modifying the stroke of said feed mechanism and periodically reversing the working and withdrawal strokes, and the length of the strokes, for predetermined time periods.

29. Machine according to claim 1, wherein said control means comprise analog signal processing means.

30. Machine according to claim 1, wherein said control means comprise digital signal processing means.

31. Machine according to claim 1 including feed control means having a comparator means (35) coupled to and controlling feed of the honing tool carrier through said resepctive planes (B,C), said comparator means being connected to and controlled by a command input means (14; 67,68,69) and by said control means (32,61).

32. Machine according claim 1 including feed control means (14,35) providing output signals to the memory means (36) when the sensor is in said respective planes (B,C) to effect storage of the sensing signals (WB,WC) provided by said sensor on the short honing blade (6,6a) at the time the sensor passes said respective planes.

* * * * *